United States Patent [19]
Fiore

[11] 3,714,835
[45] Feb. 6, 1973

[54] TUNER PUSHBUTTON SYSTEM WITH AUTOMATIC BAND MEMORY

[75] Inventor: Jack C. Fiore, Chicago, Ill.
[73] Assignee: Motorola, Inc., Franklin Park, Ill.

[22] Filed: April 21, 1971
[21] Appl. No.: 135,912

[52] U.S. Cl.....................................................74/10.33
[51] Int. Cl.....................................................F16h 35/18
[58] Field of Search....74/10.33, 10.31, 10.29, 10.27, 74/10.37, 10.35; 334/7

[56] References Cited

UNITED STATES PATENTS 3,212,343 10/1965 Clark..................................74/10.37

*Primary Examiner*—Milton Kaufman
*Attorney*—Mueller & Aichele

[57] ABSTRACT

A pushbutton tuner is provided with a plurality of memory tabs pivotally secured to a slide plate which is located adjacent the pushbuttons. The slide plate is fastened to a band selector switch which is shiftable between one or the other of the two band positions upon movement of the slide plate between its two extreme positions. A depending finger on each of the pushbuttons sets the mode or band of the associated memory tab depending on the position of the slide plate when a particular radio station is set on the memory pushbutton mechanism. Once the radio station is set, the pushbutton mechanism will automatically return to the tuned station setting as well as the proper band setting regardless of the band setting then in effect.

3 Claims, 11 Drawing Figures

INVENTOR.
JACK C. FIORE
BY Mueller & Aichele
ATTORNEYS.

INVENTOR.
JACK C. FIORE
BY Mueller & Aichele
ATTORNEYS.

TUNER PUSHBUTTON SYSTEM WITH AUTOMATIC BAND MEMORY

BACKGROUND OF THE INVENTION

This invention relates generally to tuning apparatus for combination multi-band radio receivers and more particularly to pushbutton tuning apparatus wherein each pushbutton mechanism will select the proper radio station setting and the proper band setting regardless of the band setting in effect when the pushbutton is actuated.

Multi-band receivers such as AM-FM radios are becoming more popular each year, and they are rapidly gaining popularity for use in automobiles. Pushbutton tuning of automobile radios has always been a significant feature because of the convenience and minimization of distraction to the driver when changing from one radio station to another. There are however several possible arrangements of AM-FM tuners to accomplish the selection of radio stations on either the AM band of the FM band. For example, one prior art arrangement would be to divide the number of pushbuttons into two different groups, one group, say the first two or three pushbuttons, for the AM band and the other group for the FM band. Therefore of the five pushbuttons on a given radio, this would mean that two or three pushbuttons could be used when the band selector switch is in the AM band position and two pushbuttons could be used when the band selector switch is in the FM band position. Any other combination may be used as desired. However, actuation of one of the pushbuttons which is set for AM reception when the band selector switch is in the FM setting will cause no radio station to be received until the operator shifts the band selector switch to the proper band setting. Another prior art arrangement to accomplish this result would be to have what is known as a five by 10 arrangement. That is, a selector switch allows the five pushbuttons of the radio to select any of five radio stations in either band depending on that particular band setting then in effect. That is, the selector switch will determine whether all five pushbuttons will function in the AM band or in the FM band, and this must be done manually. However, this arrangement is relatively expensive in that it requires each pushbutton to have associated therewith two separate tuner actuating devices and means to shift the connection of the pushbutton from one actuating device to the other.

Heretofore, certain attempts to develop a tuning mechanism for combination AM-FM radios, which tuning mechanism was capable of being programmed by the user to a preselected AM or FM station, have involved expensive and complex structures and elaborate switching systems.

SUMMARY OF THE INVENTION

Accordingly, it is an object of this invention to provide an improved pushbutton tuning mechanism which not only will set the tuning coils within a radio to the proper position but also will automatically effect the proper band setting of the radio so that the radio station previously set in the radio will be received.

Another object of this invention is to provide a new and improved AM-FM band selector mechanism which is simple to operate and inexpensive to manufacture.

Briefly, the band memory mechanism of this invention operates automatically when a desired radio station is set on a given pushbutton. This is achieved by providing a slide plate mounted in the radio receiver so as to effect actuation of a band selector switch when the slide plate is moved between its two extreme positions. A plurality of memory tabs are pivotally secured to the slide plate and actuated either to a right hand or left hand angular position depending upon the particular band then being memorized. When the pushbutton selector is pulled outward, in the conventional manner for setting in a new radio station, a finger associated with the pushbutton will then set the memory tab in accordance with whatever band the radio is in. By the term setting, it is meant that the memory tab will either be moved into position by the finger associated with the pushbutton or no movement at all will take place if the tab is already in position. A guide member is located on the underside of each pushbutton and will engage the associated memory tab when the slide plate is in a band position other than the position so memorized by the memory tab. When this is the case, engagement of the guide member and memory tab effect a lateral shifting of the slide plate to the memorized position and the radio is then put in the proper band. However, it will be understood that if the radio is already in the proper band setting, no movement of the slide plate will take place. The guide member can take any suitable form such as a guide stud as illustrated herein or it may be formed as part of the pushbutton itself. Furthermore, it may be V-shaped or rounder as desired so long as it produces the necessary lateral movement of the slide plate.

BRIEF DESCRIPTION OF THE DRAWINGS

Throughout the several views of the drawings, like reference numerals are intended to designate similar elements or components.

DESCRIPTION OF THE ILLUSTRATED EMBODIMENT

Figure 1:
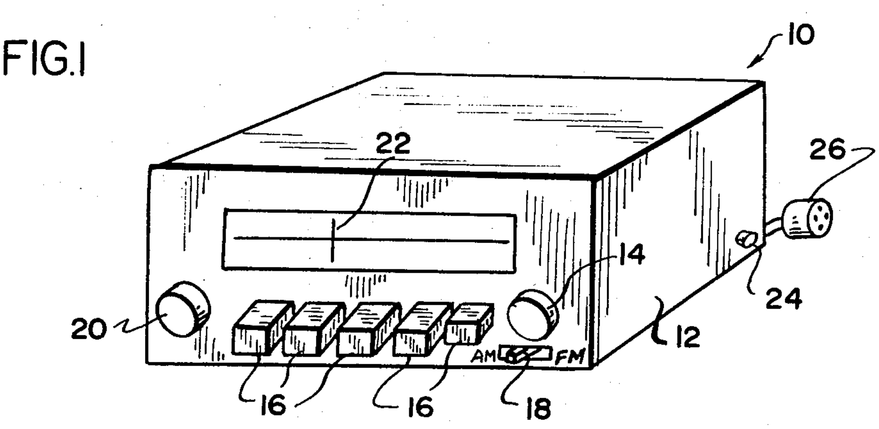
FIG. 1 is a diagrammatic perspective view of an AM-FM radio receiver wherein the automatic band memory mechanism of this invention is utilized.

Referring now to FIG. 1 there is seen an AM-FM radio designated generally by reference numeral 10. The radio 10 has a housing 12 in which is located radio frequency selector means, not shown, to be actuated either by a manual tuning knob 14 or by depressing any one of the plurality of pushbutton selectors 16. The radio frequency selector within the housing 12 is here intended to be of conventional design and forms no part of this invention. A band selector switch 18 is located at the front panel of the housing 12, at any convenient location, and is manually actuated either to an FM band position or to an AM band position as desired. Manual selection of the desired band can be accomplished at any time during the operation of the radio. That is, any one of a plurality of AM stations can be scanned either manually by the knob 14 or by the pushbutton 16 which are set to the AM band and thereafter any one of a plurality of FM stations can be scanned in like manner.

The radio 10 may be equipped with other conventional and well known elements such as an on-off switch and volume control knob 20, an indicator dial 22, and antenna jack 24 for receiving an external antenna connection, and a power and speaker cable connector 26. These and other conventional radio connections may be utilized for connecting the radio into an automobile.

Figure 2:
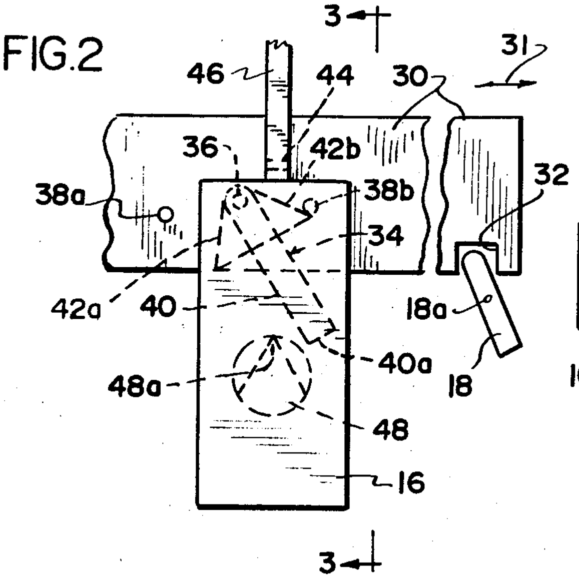
FIG. 2 is an enlarged top, fragmentary view of a simple pushbutton arrangement of this invention.
Figure 3:
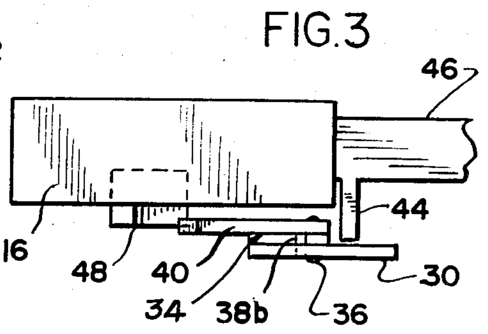
FIG. 3 is a side view taken along line 3—3 of FIG. 2.

Referring now to FIGS. 2 and 3, the particular details of construction of the automatic band memory mechanism of this invention are more fully illustrated. A slide plate 30 extends from side to side underneath the plurality of pushbutton selectors 16, only one pushbutton selector being shown in these figures. The slide plate 30 is movable left to right as indicated by the arrowed line 31. A notch 32 receives one end of the selector switch 18 which is pivoted at the point 18*a*. When the slide plate 30 is automatically moved from one position to another, so also is the selector switch 18 moved from one band position to another band position, but when the selector switch 18 is manually moved from one band position to another band position so is the plate 30 moved. Therefore, if a particular radio station is received and is to be set into the memory mechanism of the pushbutton tuner, the position of the slide plate 30 will indicate the band which the radio station is in. The selector switch 18 is here shown only diagrammatically but it will be understood that it may include any number of suitable electrical and mechanical switching devices arranged as necessary to effect mode changes between the AM band and the FM band. Secured to the slide plate 30 is a plurality of memory tabs 34, only one of which is here shown, which are pivoted about an associated pin 36. For each pushbutton selector at the front of the radio 10 there is provided a memory tab 34 associated therewith. The memory tab 34 will be in one or the other of two positions, and will remain in one of these positions until the associated pushbutton selector 16 is pulled outwardly in the conventional manner for setting of a new radio station on one band when the memory tab 34 is positioned to indicate the other band. The pivotal movement of the memory tab 34 is limited by stops 38*a* and 38*b* formed on the slide plate 30 and located on either side of the memory tab 30.

For a more detailed description of a typical memory tab 34 reference is now made to FIG. 4 which illustrated the tab configuration as having a main extended bar portion 40 and a pair of wing portions 42*a* and 42*b* extending outward from below the bar portion 40. The bar portion 40 extends from the pivot 36 a distance sufficient to interfere with a guide member 48 which prevents its inadvertent movement to the other band position until such time as the pushbutton 16 is pulled outwardly. When the pushbutton is pulled outwardly this will allow sufficient clearance space for the end 40*a* of the bar portion 40 to move in front of the guide member 48. The bar portion 40 is positioned about the winged portions 42*a* and 42*b* and thus engages the guide member 48 as the pushbutton 16 is urged inwardly when a desired radio station is being recalled, or when a new radio station is being set on the pushbutton selector.

Returning again to FIGS. 2 and 3 the pushbutton 16 is fastened to an actuating rod 46 from which depends a finger like member 44 which is positioned to engage either one of the other of the wing portions 42*a* or 42*b* depending upon the position of the memory tab 34. That is, if the memory tab 34 is in a position as shown in FIG. 2, pulling of the pushbutton selector 16 in an outward direction, which is downward as seen on the drawing, will cause the finger 44 to engage with the wing like portion 42*b*. This will pivot the memory tab about the pin 36 so that it is then angled in the opposite direction. There after an inward motion of the pushbutton 16 will cause the guide member 48 to ride along the bar 40 on the side which is adjacent the wing like portion 42*b* and thus shift the plate 30 to the desired band position, that is, to the position it was in when the memory tab was set. The length of the bar portion 40 is such that it extends slightly beyond the tip 48*a* of the V-shaped guide member 18. Thus, the memory tab 34 cannot inadvertently swing over to the other position unless the pushbutton 16 is retracked sufficiently to allow such movement. This feature insures that no memory tab will inadvertently change its position due to vibration or the like.

Figure 5:
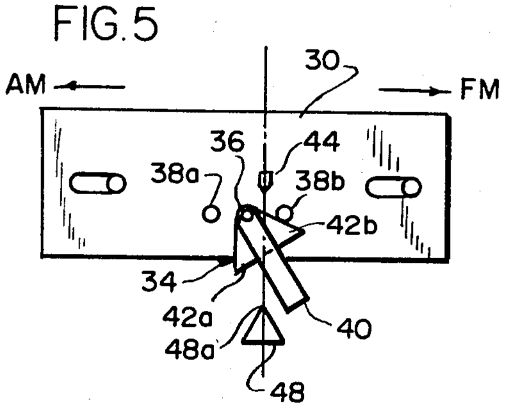
FIGS. 5 through 10 illustrate the various modes of operation of the band memory mechanism of this invention.
Figure 6:
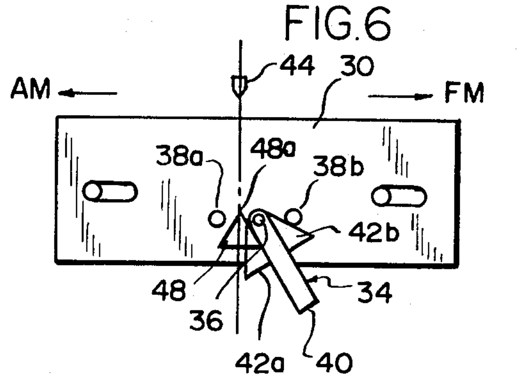

The operation of the pushbutton tuner with the automatic band memory of this invention is best illustrated by reference to FIGS. 5 through 10. As seen in FIG. 5, the selector plate 30 is assumed to be in the AM mode or position when it is in the left of center position as shown. Another assumption we will make is that the selector switch 18, of FIG. 1, was in the FM mode position when the particular radio station was set into the memory mechanism. Therefore, upon inward actuation of the pushbutton selector 16 to recall the previously set FM radio station, the V-shaped guide member 48 will move against the bar portion 40 to effect a component of force which is sideways so that the selector plate 30 is forced to the right, as shown in FIG. 6. As seen in FIG. 2 the selector plate is connected to the selector switch 18 and movement of the plate 30 will also cause movement of the switch 18. As long as the memory tab 34 is angled to the FM position pressing of the pushbutton 16 will always cause selection of the FM mode of operation regardless of the starting position of the selector plate 30.

Figure 7:
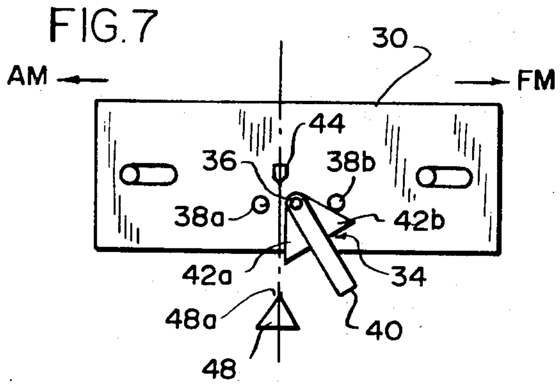
Figure 8:
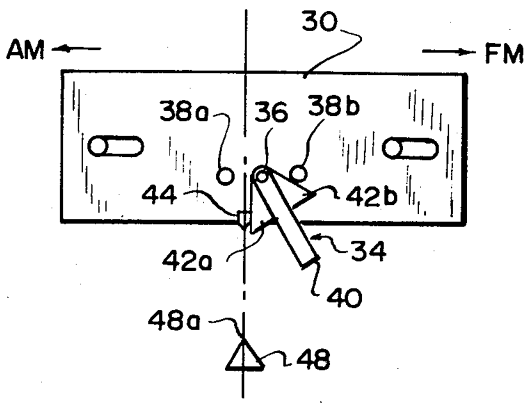
Figure 9:
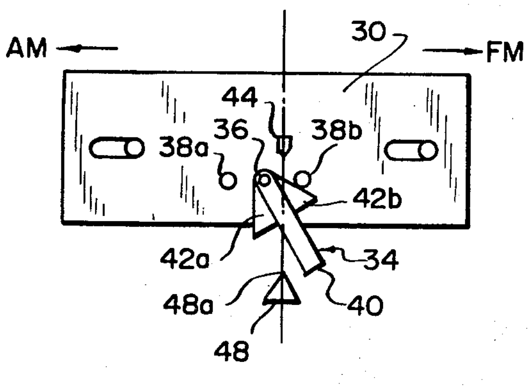
Figure 10:
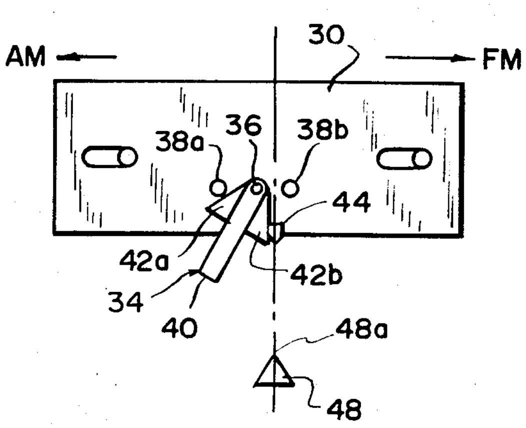

To reset a given pushbutton selector 16 to a different radio station with the same FM band, the finger 44 which is depending from the actuating bar 46 will move along the side of the winged portion 42*a* and effect no movement of the memory tab 34 since the tab 34 is already in the desired FM band position. This is best seen in FIGS. 7 and 8 which show the finger 44 moving along the edge of the winged portion 42*a* when the pushbutton 16 is retraced so that the guide stud 48 and finger 44 are moved outwardly as seen in FIG. 8. However, if it is desired to set in an AM station while the memory tab is in the FM position, outward movement of the pushbutton 16 will pull the finger 44 across the winged portion 42*b* and shift its position as shown in FIGS. 9 and 10. Any subsequent actuation of the pushbutton selector 16 will cause the guide member 48 to ride along the bar portion 40 on the side of the winged portion 42*b* to always set in the previously set AM radio station regardless of the then existing setting of the selector plate 30. It will be understood that the same mode of operation is true for setting in an FM band station when the memory tab 34 is previously set for AM band reception.

It will be understood that the guide member 48 may be a guide stud as illustrated herein or it may be formed as an integral part of the pushbutton. Also it may have a shape other than the V-shape as shown.

Figures 4, 11:
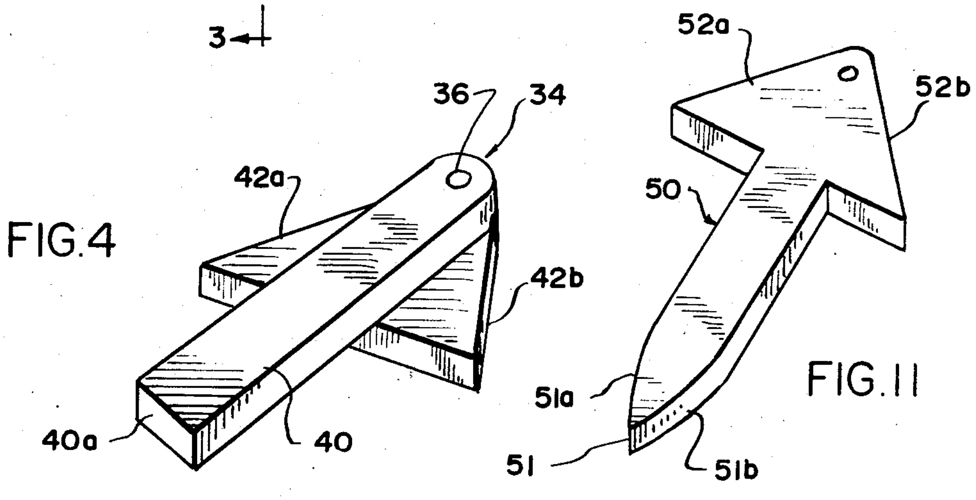
FIG. 4 is an enlarged perspective view of the memory tab configuration used in this invention.
FIG. 11 illustrates a modified form of a memory tab which can be used in accordance with this invention.

Referring to FIG. 11 a modified form of the memory tab is shown and is designated by reference numeral 50. The form of the memory tab 34 of FIG. 4 allows overlapping travel of the functions of recall and reset operations of the pushbutton. This reduces the size of the pushbutton mechanism but it may not be necessary to have the memory tabs with wing portions at different levels. For example, the memory tab 50 illustrates wing portions 52*a* and 52*b* at the same level as the bar portion thereof. This arrangement may be used when there is sufficient space for pushbutton travel. Also, the front end of the memory tab 50 is curved on both sides thereof as indicated by reference numerals 51*a* and 51*b* and come to a point at 51. This minimizes the possibility of the memory tab hanging up or jamming with the guide member 48. It will be understood that the curved front end of the memory tab 50 may be incorporated into the front end of the memory tab 34, of FIG. 4, as well as the wing portions 52*a* and 52*b* being of the same level as the bar portion.

What has been described is a simple and inexpensive means of providing AM-FM operation of a pushbutton radio wherein not only is the particular radio station setting recalled automatically upon depressing the pushbutton, but also the band is automatically recalled. Although the illustrated embodiment of this invention is shown in connection with an AM-FM radio receiver, it will be understood that any desired two band operation can be incorporated, such as short wave and long wave operation.

I claim:

1. A memory mechanism for use in a two band radio receiver, comprising in combination, a housing for containing frequency selector means to be actuated by pushbutton manipulation to a desired radio station, setting switch means to be actuated for selecting the desired band of the radio, a slide plate located within the housing and shiftable between two positions to actuate said switch means between its two band selecting positions, a plurality of memory tabs pivotally secured to said slide plate, a plurality of pushbutton selectors extending from said housing and associated with each of said memory tabs, each said memory tab being pivotally movable to one or the other of two positions in response to setting of a radio station on one or the other of the bands, finger means extending from each said pushbutton selector, each said memory tab including a bar portion extending from a pivot point toward the associated pushbutton selector and wing portions extending outwardly of said bar portion and having a height which terminates beneath the uppermost portion of said bar portion so as to be activated by said finger means when said pushbutton selector is pulled outwardly of said housing to set a preselected radio station, said finger means shifting said memory tab so it will then correspond to the band position of said slide plate, and a guide member on each of said pushbutton selectors, said guide member being engageable by said bar member with a selected pushbutton being urged inwardly to select a predetermined station to shift said memory tab and slide plate with said slide plate being positioned to operate said switch means to the band other than the band of said selected pushbutton, said shifting of said slide plate thereby operating said switch means to the band of said selected pushbutton.

2. The memory mechanism of claim 1 wherein said switch means will select between AM and FM bands.

3. A memory mechanism for use in a two band radio receiver, comprising in combination, a housing for containing frequency selector means to be actuated by pushbutton manipulation to a desired radio station, setting switch means to be actuated for selecting the desired band or the radio, a slide plate located within the housing and shiftable between two positions to actuate said switch means between its two band selecting positions, a plurality of memory tabs pivotally secured to said slide plate, a plurality of pushbutton selectors extending from said housing and associated with each of said memory tabs, each said memory tab being pivotally movable to one or the other of two positions in response to setting of a radio station on one or the other of the bands, finger means extending from each said pushbutton selector and engaging said memory tab when said pushbutton selector is pulled outwardly of said housing to set a preselected radio station, said finger means shifting said memory tab so it will then correspond to the band position of said slide plate, each said tab means includes a bar portion which extends a given distance toward and wing portions extending outwardly of said bar portion and having a height which terminates beneath the uppermost portion of said bar portion so as to be actuated by said finger means when the pushbutton selector is pulled outwardly of said housing to set a preselected radio station being engageable with an associated memory tab to shift said memory tab and said slide plate with a selected pushbutton being moved inwardly to select said preselected station and with said slide plate being positioned to operate said switch means to the band other than the band of said selected pushbutton, said shifting of said slide plate thereby operating said switch means to the band of said selected pushbutton, said guide member further being spaced from said tab means a distance greater than said given distance when said pushbutton selector is moved outwardly for setting a radio station, thus allowing free pivotal movement of said tab means by said finger means.

* * * * *